Dec. 1, 1959 M. H. EMRICK 2,914,932
LUBRICATING SYSTEM FOR UNIVERSAL LINK DRIVES
Filed May 17, 1957
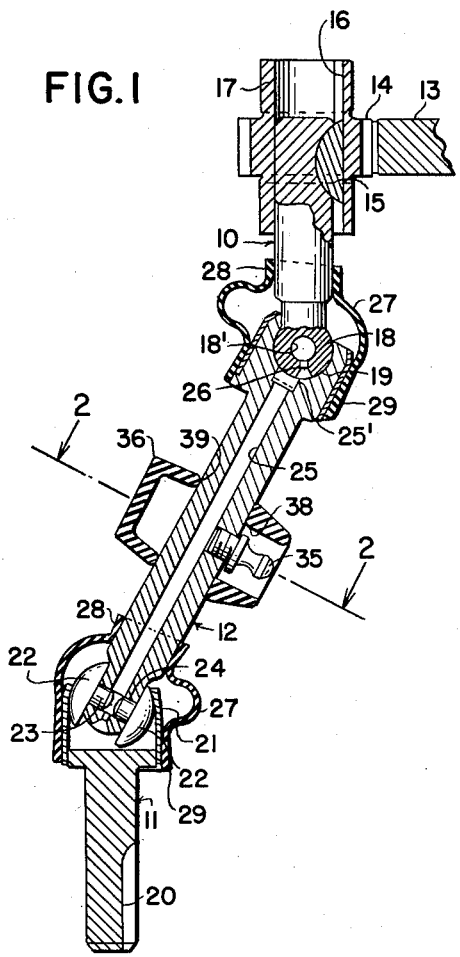
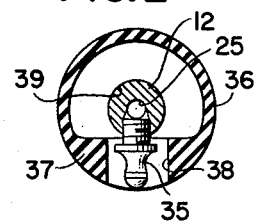
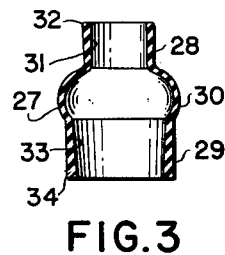
INVENTOR.
MELVIN H. EMRICK
by
Howard E. Thompson
ATTORNEY

United States Patent Office 2,914,932
Patented Dec. 1, 1959

2,914,932

LUBRICATING SYSTEM FOR UNIVERSAL LINK DRIVES

Melvin H. Emrick, Manhasset, N.Y.; Dorothea A. Emrick, executrix of the estate of said Melvin H. Emrick, deceased Application May 17, 1957, Serial No. 659,775

3 Claims. (Cl. 64—32)

This invention relates to link drives between drive and driven shafts or spindles, wherein the link has a universal mounting in connection with the shafts or spindles. More particularly, the invention deals with a lubricating system, wherein covers of flexible material envelope the universal joints at ends of the link and the associated shafts or spindles to maintain lubricant in the environment of the universal joints and, particularly, wherein the lubricant is injected through a nipple, substantially centrally of the link and entering at a bore of the link opening into the joint ends of the link.

Still more particularly, the invention deals with a system of the character defined, wherein a safety ring is mounted on the link to envelope the lubricant nipple fixed thereto.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic sectional view, illustrating one adaptation of my lubricating system, with parts of the construction broken away and parts shown in elevation.

Fig. 2 is a section on line 2—2 of Fig. 1; and

Fig. 3 is a sectional detailed view of one of the joint covers which I employ, detached.

In illustrating one adaptation and use of my improved lubricating system, I have shown, in Fig. 1, a drive shaft or spindle 10 for actuating an offset driven shaft and spindle 11 through the medium of a link 12. At 13 is shown a small portion of a drive gear, which actuates a pinion 14 mounted on the shaft or spindle 10 and keyed thereto, as indicated by the key 15, the key 15 being movable in a longitudinal keyway 16 in the sleeve portion 17 of the pinion 14.

The purpose of this construction is to provide quick coupling and uncoupling of the shaft or spindle 10 with the pinion 14 and also to automatically adjust the position of the shaft or spindle 10 with respect to the pinion.

The lower end of the shaft or spindle 10 has a rounded or ball-like member 18, which seats in the socket 19 at the upper end of the link 12.

The driven shaft or spindle 11 has a keyway 20 for coupling with a member to be driven, the latter being not shown, as it forms no part of the present invention. The upper end of the shaft or spindle 11 has a socket portion 21, in which the rounded heads 22 of two pins 23 are mounted, the pins 23 being positioned in a bore 24 in the lower end of the link 12, thus providing a universal mounting of the link 12 with the driven shaft or spindle 11.

It will appear that the link 12 has a longitudinal bore 25 extending therethrough, the lower end of the bore opening into the space between the pins 23 so as to allow lubricant to enter the entire joint structure at the lower end of the link, the upper end of the bore 25 being slightly enlarged, as seen at 25', and the enlarged portion opens into the seat of the socket 19, in which the rounded head 18 is mounted.

It will be noted that the rounded or ball end 18 has a transverse bore 18' therein with a flared passage 26 opening to the periphery of the head to register with the enlargement 25' of the bore 25, so that lubricant is free to extend, not only to the joint, but to the environment of the joint. The environments of both joints are enclosed by covers of flexible material and, as both covers are of the same general construction, the brief description of one will apply to the other. These covers are identified by the reference character 27 and are, preferably, formed of rubber or synthetic rubber, the covers being of the structure clearly illustrated in Fig. 3. In this figure, it will be noted that the covers 27 have a small diameter tubular end 28, a large diameter end 29, which ends are joined by a rounded thin walled intermediate portion 30.

The end portion 28 has a straight bore 31 and the outer wall is tapered or flared outwardly to form an enlarged outer end 32. The end portion 29 has a straight outer wall, but a contracted bore 33 which again forms an enlarged outer end, as at 34. These enlarged or thickened outer ends 32, 34 provide tensional engagement of the cover with the respective supports, in connection with which they are mounted. In other words, with the upper cover 27, shown in Fig. 1, the small end 28 engages the spindle or shaft 10; whereas the enlarged end 29 engages the socket 19. In contrast, the lower cover 27 has its small end 28 engaging the lower end portion of the link 12; whereas, the large end 29 engages the socket at the upper end of the shaft or spindle 11.

Coupled with the link 12 substantially centrally with respect to its ends and communicating with the bore 25 is a lubricant or grease admission nipple 35, such as commonly employed in various types and kinds of lubricating systems and with which a greasegun or other source of lubrication is adapted to be coupled in delivering the grease or lubricant to the universal joints, as well as the pockets surrounding the joints formed by the covers 27.

It is pointed out, at this time, that, in the event of an excess pressure charge of the lubricant to the system, at least one of the ends 28, 29 of the covers will flex to allow lubricant to escape therethrough, without any injurious effects upon the cover as a whole.

It will be understood that the nipple 35 is arranged upon a driving member, such as the link 12, which is rotating at whatever speed prevails in the drive between the shaft or spindle 10 and the shaft or spindle 11.

To avoid any injury to operators on machines or apparatus, in connection with which drives of the type and kind are used, I provide, as part of this system, a safety ring 36 which is positioned on the link 12 prior to attachment of the nipple 35 thereto. The ring 36 is generally circular in form, as clearly noted in Fig. 2, and has, at one side thereof, a heavy walled portion, as noted at 37 in Fig. 2, in which is formed a bore or passage 38, which extends out sufficiently to completely house the nipple 35.

The ring 36 is preferably composed of rubber and the bore or passage 39, through the axis of the ring, can preferably be normally slightly smaller than the diameter of the link 12, so that the ring 36 will frictionally retain a position substantially central to that illustrated in Fig. 1. In any event, it will be apparent that the nipple arranged in the passage 38 automatically keys the ring for positioning on the link 12.

Having fully described my invention, what I claim as new and desire to secure by Letters Patent is:

1. In a drive of the character described employing a drive spindle, a driven spindle and a link operatively coupling said spindles and having universal joint couplings directly with the spindles, the coupling of one spindle comprising an integral socket and the other spindle an integral ball, means for lubricating the universal joints, said means comprising a chamber cover of flexible materials directly on both spindles and adjacent end portions of the link, said link having a longitudinal bore extending the full length of the link and opening into the joint ends of the link, one end of the link having an integral socket for receiving the ball end of one spindle, means intermediate the ends of the link for admitting a lubricant into said bore for transmission to the joints and the chambers of said covers, said covers having large and small diameter tubular ends joined by a thin wall enlarged rounded portion, the small diameter end of one cover being arranged on one spindle, and the small diameter end of the other cover being arranged on said link.

2. In a drive of the character described employing a drive spindle, a driven spindle and a link operatively coupling said spindles and having universal joint couplings directly with the spindles, the coupling of one spindle comprising an integral socket and the other spindle an integral ball, means for lubricating the universal joints, said means comprising a chamber cover of flexible materials directly on both spindles and adjacent end portions of the link, said link having a longitudinal bore extending the full length of the link and opening into the joint ends of the link, one end of the link having an integral socket for receiving the ball end of one spindle, means intermediate the ends of the link for admitting a lubricant into said bore for transmission to the joints and the chambers of said covers, said covers having large and small diameter tubular ends joined by a thin wall enlarged rounded portion, the small diameter end of one cover being arranged on one spindle, the small diameter end of the other cover being arranged on said link, and a safety ring of flexible material mounted on the link and including a passage enveloping said lubricant admission means.

3. In a drive of the character described employing a drive spindle, a driven spindle and a link operatively coupling said spindles and having universal joint couplings directly with the spindles, the coupling of one spindle comprising an integral socket and the other spindle an integral ball, means for lubricating the universal joints, said means comprising a chamber cover of flexible materials directly on both spindles and adjacent end portions of the link, said link having a longitudinal bore extending the full length of the link and opening into the joint ends of the link, one end of the link having an integral socket for receiving the ball end of one spindle, means intermediate the ends of the link for admitting a lubricant into said bore for transmission to the joints and the chambers of said covers, said covers having large and small diameter tubular ends joined by a thin wall enlarged rounded portion, the small diameter end of one cover being arranged on one spindle, the small diameter end of the other cover being arranged on said link, a safety ring of flexible material mounted on the link and including a passage enveloping said lubricant admission means, said ring including a chamber surrounding said link and opening into the passage of said ring, the axis of said ring being common with the axis of said link, and the walls of the tubular ends of the covers being thicker at the outer extremities thereof.

References Cited in the file of this patent

UNITED STATES PATENTS

| | | |
|---|---|---|
| 540,558 | Peregrine | June 4, 1895 |
| 1,038,085 | Chubbuck | Sept. 10, 1912 |
| 1,153,984 | Watts | Sept. 21, 1915 |
| 1,316,733 | McGee | Sept. 23, 1919 |
| 1,551,654 | Garman | Sept. 1, 1925 |
| 1,939,653 | Bijur | Dec. 19, 1933 |
| 2,755,641 | Dunn | July 24, 1956 |
| 2,780,079 | Wahlberg | Feb. 5, 1957 |

FOREIGN PATENTS

| | | |
|---|---|---|
| 683,833 | Great Britain | Dec. 3, 1952 |